US008495323B1

(12) United States Patent
Tatavarty

(10) Patent No.: US 8,495,323 B1
(45) Date of Patent: Jul. 23, 2013

(54) METHOD AND SYSTEM OF PROVIDING EXCLUSIVE AND SECURE ACCESS TO VIRTUAL STORAGE OBJECTS IN A VIRTUAL MACHINE CLUSTER

(75) Inventor: Venkata Tatavarty, Sunnyvale, CA (US)

(73) Assignee: Symantec Corporation, Mountain View CA ( * ) Notice: Subject to any disclaimer, the term of this patent is extended or adjusted under 35 U.S.C. 154(b) by 316 days.

(21) Appl. No.: 12/962,234

(22) Filed: Dec. 7, 2010

(51) Int. Cl.
*G06F 12/14* (2006.01)
(52) U.S. Cl.
USPC ............................. 711/164; 711/6; 711/209
(58) Field of Classification Search
None
See application file for complete search history.

(56) References Cited

U.S. PATENT DOCUMENTS

| | | | |
|---|---|---|---|
| 5,852,724 A | 12/1998 | Glenn et al. |
| 5,946,685 A | 8/1999 | Cramer et al. |
| 6,230,246 B1 | 5/2001 | Lee et al. |
| 6,353,898 B1 | 3/2002 | Wipfel et al. |
| 6,360,331 B2 | 3/2002 | Vert et al. |
| 6,389,433 B1 | 5/2002 | Bolosky et al. |
| 6,421,777 B1 | 7/2002 | Pierre-Louis et al. |
| 6,438,642 B1 | 8/2002 | Shaath |
| 6,438,705 B1 | 8/2002 | Chao et al. |
| 6,493,811 B1 | 12/2002 | Blades et al. |
| 6,513,051 B1 | 1/2003 | Bolosky et al. |
| 6,526,521 B1 | 2/2003 | Lim |
| 6,587,959 B1 | 7/2003 | Sjolander et al. |
| 6,624,750 B1 | 9/2003 | Marman et al. |
| 6,629,266 B1 | 9/2003 | Harper et al. |
| 6,738,345 B1 | 5/2004 | Williamson |
| 6,754,664 B1 | 6/2004 | Bush |
| 6,754,781 B2 | 6/2004 | Chauvel et al. |
| 6,763,479 B1 | 7/2004 | Hebert |
| 6,799,316 B1 | 9/2004 | Aguilar et al. |
| 6,920,537 B2 | 7/2005 | Ofek et al. |
| 6,922,791 B2 | 7/2005 | Mashayekhi et al. |
| 6,943,828 B1 | 9/2005 | Grimes et al. |
| 6,944,788 B2 | 9/2005 | Dinker et al. |
| 6,983,365 B1 | 1/2006 | Douceur et al. |
| 7,137,040 B2 | 11/2006 | Bae et al. |
| 7,200,604 B2 | 4/2007 | Forman et al. |
| 7,302,593 B2 | 11/2007 | Rothman et al. |
| 7,310,644 B2 | 12/2007 | Adya et al. |
| 7,359,920 B1 | 4/2008 | Rybicki et al. |
| 7,376,722 B1 | 5/2008 | Sim et al. |
| 7,424,514 B2 | 9/2008 | Noble et al. |

(Continued)

OTHER PUBLICATIONS

Quéma, et al., "An asynchronous middleware for Grid resource monitoring" (abstract), Sep. 2003, 2 pages, downloaded from http://www3.interscience.wiley.com/journal/107638010/abstract?CRETRY=1&SRETRY=0.

(Continued)

*Primary Examiner* — Gary Portka
(74) *Attorney, Agent, or Firm* — Rory D. Rankin; Meyertons, Hood, Kivlin, Kowert & Goetzel, P.C.

(57) ABSTRACT

A system, method, and medium for implementing I/O fencing in a virtual machine cluster sharing virtual storage objects. A volume manager driver receives access requests from virtual machines directed to a virtual storage object such as a volume. The volume manager driver then translates the access request to point to a storage device underlying the volume. The access request includes keys and/or other group reservation data required to implement an I/O fencing method so as to prevent access to shared data by malfunctioning or non-responsive virtual machines.

19 Claims, 4 Drawing Sheets

U.S. PATENT DOCUMENTS

| | | | |
|---|---|---|---|
| 7,478,113 | B1 | 1/2009 | De Spiegeleer et al. |
| 7,672,945 | B1 * | 3/2010 | Chatterjee et al. ..... 707/999.009 |
| 7,739,541 | B1 * | 6/2010 | Rao et al. .................. 714/4.1 |
| 2003/0041057 | A1 | 2/2003 | Hepner et al. |
| 2003/0079154 | A1 | 4/2003 | Park et al. |
| 2003/0097422 | A1 | 5/2003 | Richards et al. |
| 2003/0126242 | A1 | 7/2003 | Chang |
| 2003/0163780 | A1 | 8/2003 | Kossa |
| 2004/0083358 | A1 | 4/2004 | Zhou et al. |
| 2004/0089482 | A1 | 5/2004 | Ramsden et al. |
| 2004/0158777 | A1 | 8/2004 | Bae et al. |
| 2004/0268340 | A1 | 12/2004 | Steeb et al. |
| 2005/0015780 | A1 | 1/2005 | McKeon et al. |
| 2005/0055418 | A1 | 3/2005 | Blanc et al. |
| 2005/0091375 | A1 | 4/2005 | Straub et al. |
| 2005/0172161 | A1 | 8/2005 | Cruz et al. |
| 2005/0188265 | A1 | 8/2005 | Pomaranski et al. |
| 2005/0198328 | A1 | 9/2005 | Lee et al. |
| 2005/0204183 | A1 | 9/2005 | Saika |
| 2005/0216813 | A1 | 9/2005 | Cutts et al. |
| 2005/0223278 | A1 | 10/2005 | Saika |
| 2005/0283636 | A1 | 12/2005 | Vasudevan et al. |
| 2005/0289390 | A1 | 12/2005 | Baba |
| 2006/0015773 | A1 | 1/2006 | Singh et al. |
| 2006/0053337 | A1 | 3/2006 | Pomaranski et al. |
| 2006/0085418 | A1 | 4/2006 | Piper et al. |
| 2006/0161637 | A1 | 7/2006 | Friess et al. |
| 2006/0168192 | A1 | 7/2006 | Sharma et al. |
| 2007/0206611 | A1 | 9/2007 | Shokri et al. |
| 2007/0255819 | A1 | 11/2007 | Hua et al. |
| 2007/0294496 | A1 * | 12/2007 | Goss et al. .................. 711/163 |
| 2011/0047376 | A1 * | 2/2011 | Mittal ......................... 713/164 |

OTHER PUBLICATIONS

"Using the Event Monitoring Service", Hewlett-Packard Corp., Nov. 1999, 102 pages.

Baker, et al, "javaGMA: A lightweight implementation of the Grid Monitoring Architecture," UKUUG LISA/Winter Conference, High-Availability and Reliability, Bournemouth, Feb. 25-26, 2004, http://www.ukuug.org/events/winter2004/speakers+abstracts.shtml#id2717511, 2 pages.

Cottrell, "Network Monitoring Tools," Stanford Linear Accelerator Center, Stanford University, Palo Alto, CA, Nov. 24, 2007, 29 pages. (Printed from http://www.slac.stanford.edu/xorg/nmtf/nmtf-tools.html).

Veritas Cluster Server 4.0 User's Guide, Veritas Corp., Jan. 2004, 715 pages.

Veritas Software Corporation, "Comprehensive Application Performance Management with Veritas i3™," 2003, 3 pages.

Veritas Software Corporation, "Veritas Enterprise Server Automation," 2003, 8 pages.

Veritas Software Corporation, "Server Consolidation with Veritas OpForce; Optimizing your Infrastructure Availability and Utlizations," 2003, 6 pages.

Veritas Software Corporation, "Server Automation with Veritas OpForce; Enterprise Operations Automation-Enhancing Workflows, Administration, and Management," 2003, 6 pages.

Veritas Software Corporation, "Rapid Server Deployment with Veritas OpForce; The Enterprise-Scale, Server Deployment Solution for Heterogeneous Environments," 2003, 6 pages.

Veritas Software Corporation, "High Availability Clustering in a Microsoft Windows Environment; Veritas Cluster Server for Microsoft Windows NT" 2000, 20 pages.

Veritas Software Corporation, "Veritas Cluster Server v2.0; Technical Overview," 2001, 12 pages.

Veritas Software Corporation, "Managing Application Availability with Application Clustering and the Veritas Cluster Server Version 2.0," 2002, 32 pages.

"SAP High Availability (BC-CCM-HAV)", Release 4.6C, Copyright Apr. 2001, pp. 1-258.

* cited by examiner

METHOD AND SYSTEM OF PROVIDING EXCLUSIVE AND SECURE ACCESS TO VIRTUAL STORAGE OBJECTS IN A VIRTUAL MACHINE CLUSTER

BACKGROUND OF THE INVENTION

1. Field of the Invention

The present invention relates generally to virtual machine clusters, and in particular to a method and system for sharing virtual storage objects among applications in a virtual machine cluster.

2. Description of the Related Art

Virtual machines allow organizations to make efficient use of their available computing resources. Virtual machines are often grouped into distributed clusters to maintain high availability (HA) and flexibility. One of the goals of a HA system is to minimize the impact of the failure of individual components on system availability. An example of such a failure is a loss of communications between some of the virtual machine nodes of a distributed cluster. A way to prevent data corruption following a failure of one or more nodes is to implement Input/Output (I/O) fencing.

I/O fencing is the process of isolating shared storage devices from nodes that are no longer operating as a part of the cluster to protect the data on the shared storage devices from becoming corrupted. The cluster isolates a node when it is malfunctioning to ensure that I/O operations can no longer be performed by that isolated note on the shared storage devices. When multiple nodes have access to data on shared storage devices, the integrity of the data depends on the nodes communicating with each other such that each is aware when the other accesses data on the shared storage devices. This communication occurs through connections between the nodes. If the connections between nodes are lost or if one of the nodes is hung, malfunctions, or fails, each node could be unaware of the other's activities with respect to the data on the shared storage device. This condition is known as split-brain and can lead to data corruption. To prevent the split-brain condition, I/O fencing can be utilized to isolate the non-cooperating node and control its ability to access the shared storage device. I/O fencing allows the integrity of the data to be maintained.

One method used for implementing I/O fencing of physical storage devices is based on the small computer system interface version three persistent group reservation (SCSI-3 PGR) standard. The SCSI-3 PGR standard is described in further detail in "SCSI-3 Primary Commands", published by the American National Standards Institute, Inc., the contents of which are hereby incorporated by reference. SCSI-3 PGR based mechanisms can be used to provide I/O fencing capabilities for shared storage devices. In SCSI-3 PGR based fencing, a persistent reservation is placed on a shared storage device. This reservation grants access to a specified set of nodes while at the same time denying access to other nodes.

SCSI-3 PGR allows a node to make a physical storage device registration that is persistent across power failures and bus resets. Also, group reservations are permitted, allowing all nodes within a single group to have concurrent access to the physical storage device while restricting access to nodes not in the group. The SCSI-3 PGR standard is based on the storage, reading, and preemption of reservation keys on a reserved area (or private region) of a physical storage device. To comply with the standard, each node stores certain node-specific information on a portion of the physical storage device. Also, group reservation information from a group of nodes may also be stored in a portion of the physical storage device. This information may then be used to determine which nodes may access the storage device.

For a node to be registered, the node's registration key may be written in the node's area on the reserved portion of the shared physical device. A group reservation for all registered nodes may also be placed in a separate reserved portion of the shared physical device. In some cases, the reservation key of one node may be preempted by other nodes. The SCSI-3 PGR standard allow for preemption to ensure that only one group of nodes has access to a shared storage device in the case of a split brain scenario.

The SCSI-3 PGR standard is based on a physical hardware implementation and does not apply to virtual storage devices. Other I/O fencing standards are also limited to physical storage devices. Organizations use virtual storage devices to make their storage infrastructure more manageable and flexible. Relationships are established between physical storage devices (e.g., disk drives, tape drives) and virtual storage devices (e.g., volumes, virtual disks, virtual logical units). Using virtual storage devices provides system-wide features (e.g., naming, sizing, and management) better suited to the entire virtual machine network than those features dictated by the physical characteristics of the actual storage devices.

Therefore, what is needed in the art is a method and system for implementing I/O fencing for virtual storage objects. It would be advantageous to implement a method that would allow virtual machines to use industry standard I/O fencing methodology to access virtual storage devices. This would allow virtual machines to use standard I/O fencing application programming interface (API) calls and would not require making any significant changes to the software implemented on the virtual machines or to the underlying storage device hardware.

In view of the above, improved methods and mechanisms for implementing I/O fencing for virtual machine clusters and virtual storage objects are desired.

SUMMARY OF THE INVENTION

Various embodiments of methods and mechanisms for sharing virtual storage objects in a virtual machine cluster are contemplated. In one embodiment, a volume manager driver may reserve a first private region in a virtual storage object, such as a volume. The volume may be logically mapped to a set of one or more storage devices. The first private region may be used to store metadata required for I/O fencing. The metadata may include keys, group reservation data, and other data. One or more virtual machines of a virtual machine cluster may store metadata in the private region. The first private region may be partitioned into separate regions for different virtual machines. The first private region may also be partitioned into separate regions for storing keys and for storing group reservation data. Other methods of partitioning the first private region are possible and are contemplated.

The volume manager driver may also reserve a second private region in a storage device. In one embodiment, the second private region may reside on a storage device of the set mapped from the volume. In another embodiment, the second private region may reside on a storage device separate from the set mapped from the volume. The volume manager driver may map the first private region in the volume to the second private region in the storage device. Then, a virtual machine, or an application running on the virtual machine, may send an access request to the volume manager driver. The application may need access to data stored on the volume. The access request may be addressed to the first private region on the volume.

The volume manager driver may translate the access request so that the request addresses the second private region. Keys, group reservation data, and/or other data may be sent as part of the access request. Then, the access may be accepted or rejecting according to the metadata stored in the second private region and the I/O fencing methodology being followed. If the virtual machine requesting access has a key stored in the second private region, then the access may be granted. The access request may be a preemption request; the preemption request, if granted, may result in the removal of keys from one or more virtual machines from the second private region. The access request may be handled according to an I/O fencing standard, such as the SCSI-3 PGR standard. The access may also be handled according to a different I/O fencing standard or protocol. The preceding steps may be repeated for one or more additional volumes.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
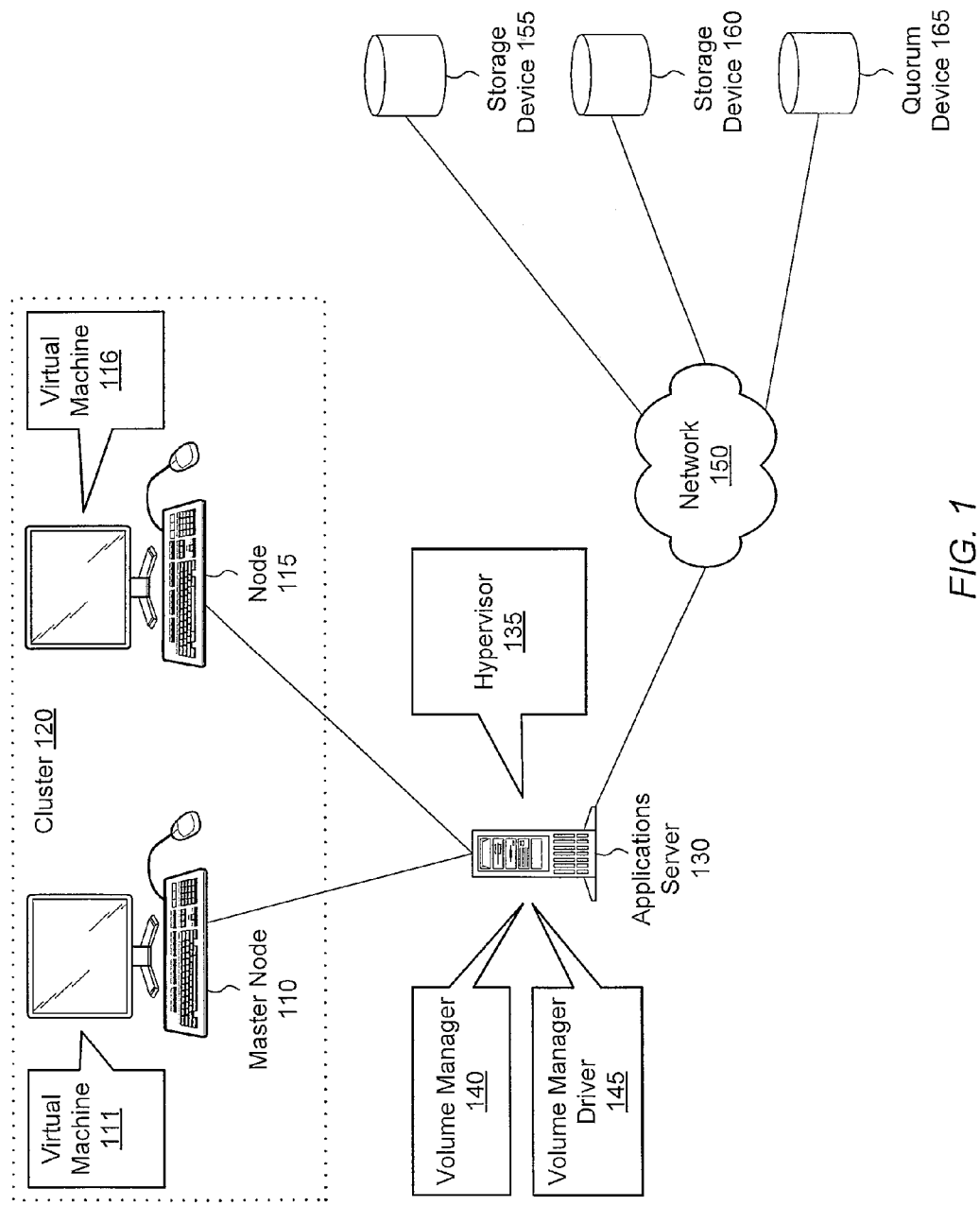
FIG. 1 is a diagram that illustrates one embodiment of a virtual machine cluster connected to shared storage devices.

Referring to FIG. 1, a generalized block diagram of one embodiment of a virtual machine cluster architecture is shown. Generally speaking, a cluster, such as cluster 120, is a group of linked nodes. The nodes, such as master node 110 and node 115, are typically connected to one another through fast local area networks (LANs), which are not shown to simplify the illustration. Cluster 120 is representative of any number of virtual machine clusters which may be connected to applications server 130. Master node 110 and node 115 are representative of any number of nodes which may be part of cluster 120. Each node may be a single computer or a multi-processor system.

Virtual machine 111 runs on master node 110, and virtual machine 111 is representative of any number of virtual machines which may execute on master node 110. Master node 110 may send control messages to other nodes of the cluster (i.e., node 115), and master node 110 may make sure all of the nodes of the cluster are synchronized and have a consistent view of the cluster's data stored in shared storage devices. Virtual machine 116 runs on node 115, and virtual machine 116 is representative of any number of virtual machines which may execute on node 115. Virtual machines 111 and 116 may each execute one or more software applications.

Applications server 130 may be connected to master node 110 and node 115 through any of a variety of direct or network connections. Applications server 130 may host one or more software applications associated with virtual machines 111 and 116, including hypervisor 135. Hypervisor 135 may be a virtualization layer or module configured to mask low-level hardware operations from one or more guest operating systems executing on virtual machines 111 and 116. Hypervisor 135 may allow multiple operating systems to execute on a single server (i.e., applications server 130). Other software applications hosted by applications server 130 may include volume manager 140 and volume manager driver 145. Alternatively, volume manager driver 145 may be running on a node, such as master node 110. Applications server 130 is representative of any number of applications servers or other types of servers which may be connected to network 150. In other embodiments, applications server 130 may be a media server, master server, host server, file server, data server and/or other type of server.

Applications server 130 is connected to network 150. Network 150 may comprise a variety of network connections including combinations of local area networks (LANs), such as Ethernet networks, Fibre Channel (FC) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Storage devices 155 and 160 are representative of any number of backup storage devices, and may comprise any of a variety of types of storage media, such as a hard disk drive, disk volume, server blade, optical drive, flash drive, tape drive, tape volume, robotic tape library, or other storage medium. In some embodiments, storage devices 155 and 160 may be SCSI-3 PGR compliant storage devices. Storage devices 155 and 160 may be referred to as a storage cluster.

In one embodiment, storage devices 155 and 160 may be accessible to applications server 130 and virtual machines 111 and 116 over network 150 using an internet small computer system interface (iSCSI) compliant protocol. The iSCSI standard facilitates data transfers over many types of networks by carrying SCSI commands over the networks. The protocol allows virtual machines 111 and 116 to send SCSI commands to remote SCSI storage devices as if the remote SCSI storage devices were directly connected to virtual machines 111 and 116. The iSCSI standard provides virtual machines with the illusion of locally-attached storage devices.

Volume manager 140 may run on applications server 130, and volume manager 140 may enable physical storage devices attached to the virtual machine cluster network to be managed as logical devices. Specifically, volume manager 140 may create and manage one or more volumes mapped from storage devices 155 and 160 and present the volumes to virtual machines 111 and 116 as virtual storage objects. Volume manager 140 may abstract the actual physical interface and underlying physical devices from virtual machines 111 and 116 and applications server 130.

Volume manager driver 145 may also run on applications server 130, and virtual machines 111 and 116 may access storage devices 155 and 160 through volume manager driver 145. Volume manager driver 145 may translate addresses received from virtual machines 111 and 116 to point to the actual storage device underneath the volume. Virtual machines 111 and 116 may reference or access portions of volume address space, and volume manager driver 145 may translate the address space of a volume into the address space of the underlying storage devices.

Volume manager driver 145 may also implement I/O fencing to manage and restrict access to the volumes associated with application server 135 and virtual machines 115 and 120. One common technique of fencing utilizes SCSI-3 PGR based mechanisms for restricting access to shared storage devices. Although the SCSI-3 PGR standard is only one example of an I/O fencing standard, the term "SCSI-3 PGR" may be used interchangeably with "I/O fencing method" throughout this specification. Other I/O fencing methods include SAN fabric fencing, "Shoot the other node in the head" STONITH, and reserve/release.

Volume manager driver 145 may allow fine grain access to the volumes mapped to storage devices 155 and 160. One virtual machine may have write access to a volume, a second virtual machine may have read access to the volume, and a third virtual machine may have no access to the volume. Volume manager driver 145 may create a private region in the volume for the storage of keys, placeholders, group reservation data, and/or other metadata associated with the virtual machines. Volume manager driver 145 may also create a private region in storage device 155 or storage device 160. Alternatively, volume manager driver 145 may create a private region in a storage object separate from storage devices 155 and 160. The private regions may be partitioned into separate regions for different virtual machines. The private regions may also be partitioned into separate regions for storing keys and for storing group reservation data. Other methods of partitioning the private regions are possible and are contemplated.

Volume manager driver 145 may map the private region of the volume to the private region in the actual physical storage device. When volume manager driver 145 receives an access request from a virtual machine addressed to the private region of the volume, volume manager driver 145 may translate the access request to address the private region in the physical storage device. The above-described steps may be repeated for multiple volumes.

The access request may include a key from the virtual machine making the request. The key may be a 64-bit key as defined by the SCSI-3 PGR standard. Alternatively, other sizes of keys may be used. Also, the access request may include group reservation data corresponding to the group to which the virtual machine making the request belongs. The private region of the physical storage device may contain a set of keys and/or group reservation data for all of the virtual machines that have access to the storage device.

Volume manager driver 145 may store one or more extra sets of keys on different storage devices. The extra sets of keys may allow for keys to be recovered if there is a failure of the storage device containing the primary set of keys. It may be necessary for volume manager 140 to migrate a volume from a first set of one or more storage devices to a second set of one or more storage devices. Volume manager 140 may migrate a volume from a first set to a second set of storage devices for a variety of reasons. The reasons may include a failure, malfunction, or corruption of data at one of the storage devices underlying the volume. Migrating the volume may involve copying one of the extra sets of keys to a private region of the second set of storage devices. If the storage device storing the primary set of keys fails or malfunctions, the primary set of keys may be lost or inaccessible. In this case, volume manager driver 145 may retrieve a set of keys from one of the locations where the extra sets of keys are stored. Volume manger driver 145 may create a private region in the second set of storage devices, and then volume manager driver 145 may copy the extra set of keys to the newly created private region in the second set of storage devices. The set of keys may include keys from one or more nodes, group registration data for one or more groups of nodes, and other data associated with an I/O fencing method. One or more of the functions described above as being performed by volume manager driver 145 may be performed by volume manager 140, and vice versa.

Quorum device 165 may also be connected to network 150, and quorum device 165 may play a role in determining which group of virtual machines will maintain access to a shared storage device during a split-brain scenario. To resolve a split-brain scenario, each virtual machine with a key stored in the private region of the shared storage device may be given a vote to determine which group is preempted. Quorum device 165 may be given a certain number of votes to ensure there is not a tie or split decision when the virtual machines vote on which group to preempt. The group that receives the most votes, referred to as establishing a quorum, is allowed to continue to access the shared storage device in question, while the remaining group's access to the shared storage device is restricted.

Applications server 130, master node 110, and node 115 of FIG. 1 may comprise various hardware and software components. The hardware components may include one or more processors, memory devices, and input/output (I/O) devices, connected together via a bus architecture. The software components may include an operating system or a portion of an operating system stored in a memory device. The operating system may be any of various types of operating systems, such as Microsoft Windows®, Linux®, Solaris®, or others. The operating system may be operable to provide various services to the user and may support the execution of various programs such as database applications, software agents, or any of a variety of other applications.

In other embodiments, the number and type of application servers, hypervisors, volume managers, volume manager drivers, nodes, virtual machines, networks, and storage devices is not limited to those shown in FIG. 1. Any number and combination of application servers and nodes may be interconnected in network architectures via various combinations of modem banks, direct LAN connections, wireless connections, WAN links, etc. Also, at various times one or more virtual machines may operate offline. In addition, during operation, individual virtual machine connection types may change as mobile users travel from place to place connecting, disconnecting, and reconnecting to applications server 130.

Figure 2:
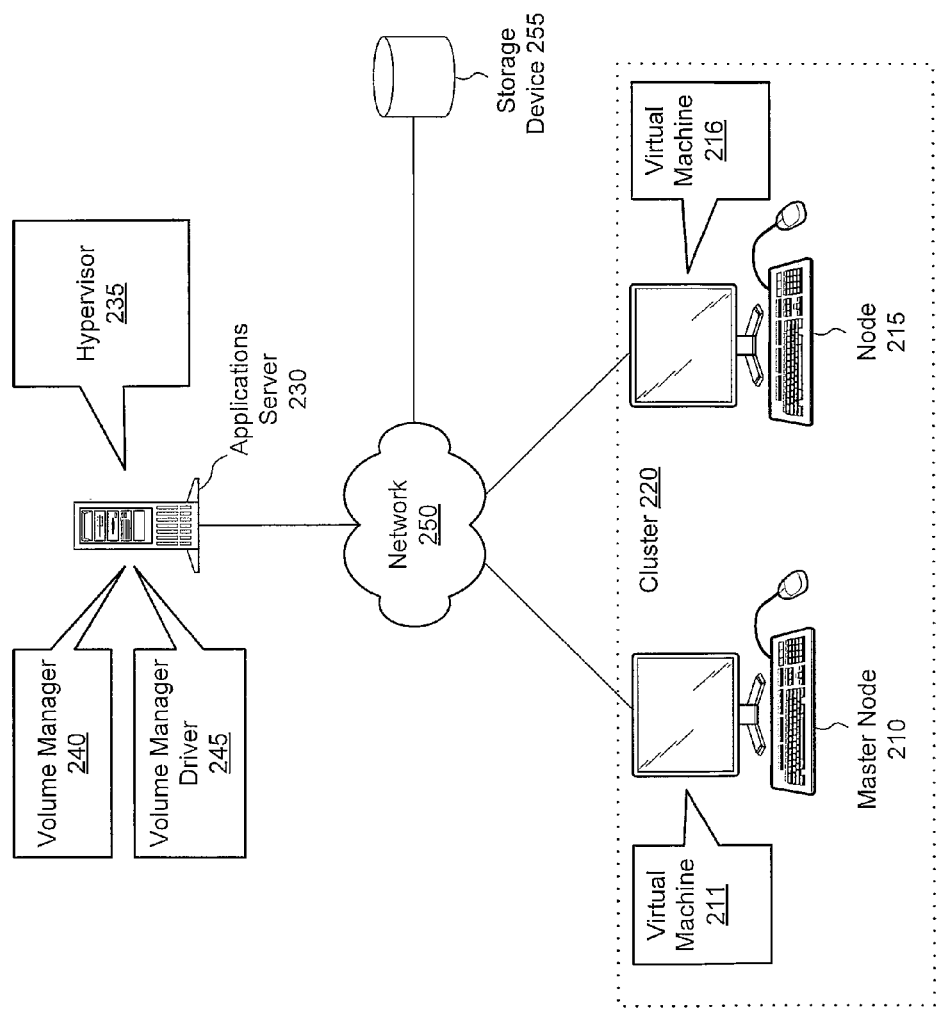
FIG. 2 illustrates a virtual machine cluster in accordance with one or more embodiments.

Referring now to FIG. 2, an illustration of another embodiment of a virtual machine cluster architecture is shown. Applications server 230 may host one or more software applications including volume manager 240, volume manager driver 245, and hypervisor 235. Applications server may connect to network 250, and master node 210 and node 215 may connect to applications server 230 through network 250. Network 250 may be any of the types of networks previously mentioned. Master node 210 hosts virtual machine 211 and node 215 hosts virtual machine 216. Cluster 220 includes master node 210 and node 215, and cluster 220 is representative of any number of clusters which may connect to applications server 230 through network 250.

Storage device 255 is also connected to network 250, and storage device 255 is representative of any number of storage devices which may be connected to network 250. Storage device 255 may also include a quorum device. Alternatively, a separate quorum device (not shown) may be connected to network 250.

Figure 3A:
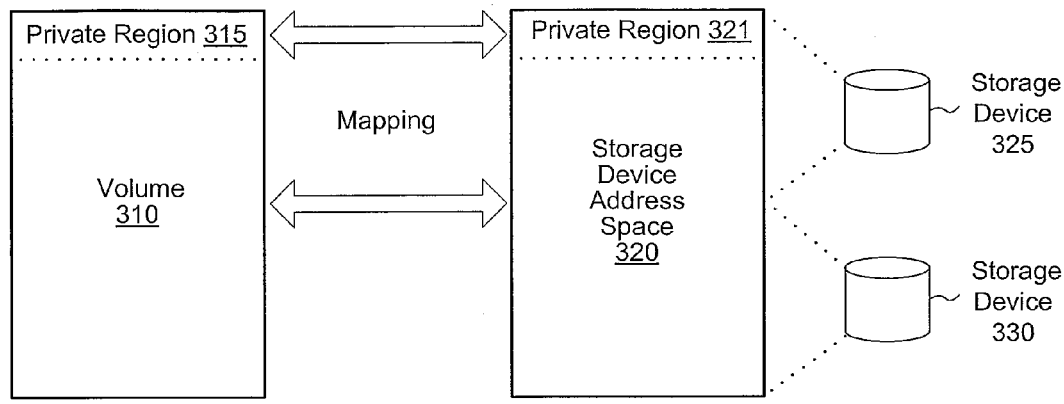
FIG. 3a illustrates one embodiment of a volume logically mapped to a set of storage devices.

Turning now to FIG. 3a, one embodiment of a volume logically mapped to a set of storage devices is shown. As referred to herein, a volume corresponds to one or more portions of one or more physical storage devices. A volume may also be referred to as a virtual storage device or as a virtual storage object. A volume is a system wide entity in that its definition does not bind it to any specific application, virtual machine, node, or server. A virtual machine may send and receive I/O commands to/from a volume as if it were a physical storage device.

As part of an I/O fencing implementation, a volume manager driver may create private region 315 in volume 310. Volume 310 may be mapped to storage device address space 320, which corresponds to storage devices 325 and 330. Private region 321 may be created in storage device address space 320, and private region 315 may be mapped to private region 321. Private region 321 may be stored in storage device 325. Storage devices 325 and 330 are representative of any number of storage devices which may be mapped to volume 310. In other embodiments, volume 310 may be mapped to a portion of one storage device, and other volumes may be mapped to other portions of the same storage device.

Figure 3B:
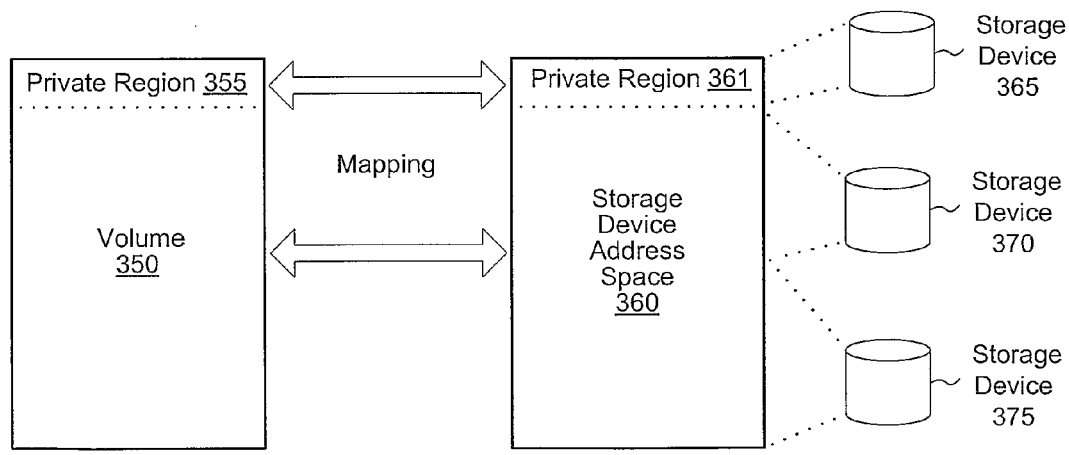
FIG. 3b illustrates a second embodiment of a volume logically mapped to a set of storage devices.

Referring now to FIG. 3b, another embodiment of a volume logically mapped to a set of storage devices is shown. Volume 350 includes private region 355, and volume 350 is mapped to storage device address space 360. Storage device address space 360 is mapped to storage devices 370 and 375. Private region 361 corresponds to storage device 365, and private region 355 may be mapped to private region 361. As shown in FIG. 3b, private region 361 is created on a separate storage device (storage device 365) from the set of storage devices (storage devices 370 and 375) organized to form storage device address space 360 corresponding to volume 350.

Figure 4:
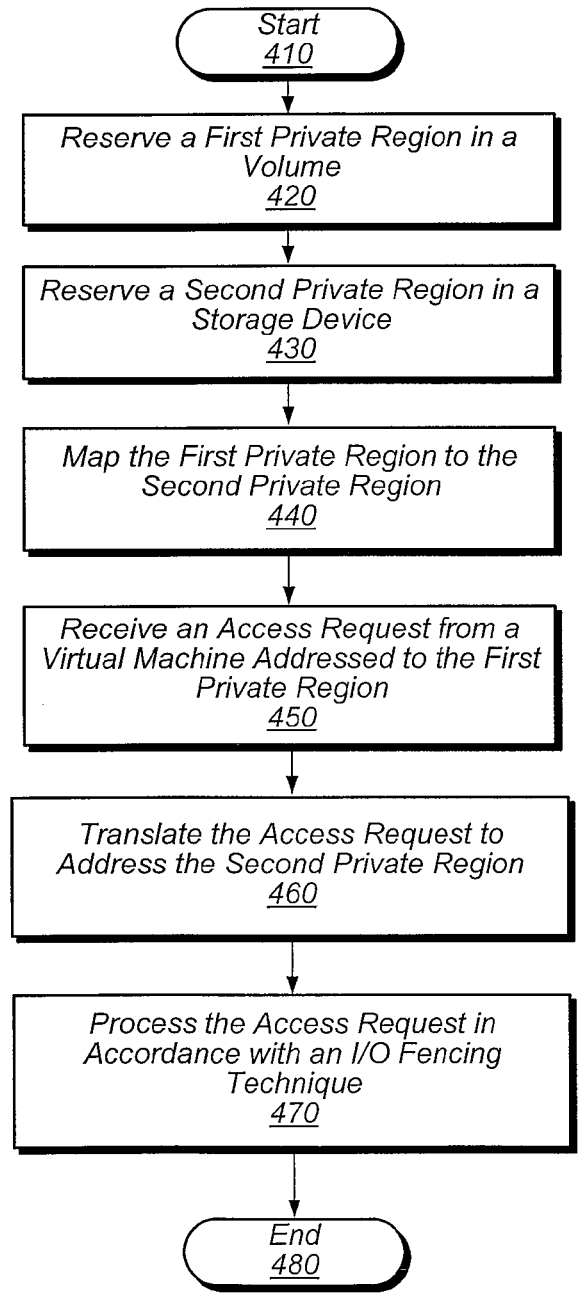
FIG. 4 is a generalized flow diagram illustrating one embodiment of an I/O fencing method for a virtual machine cluster.

Turning now to FIG. 4, one embodiment of a method for implementing I/O fencing in a virtual machine cluster with shared virtual storage objects is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 400 starts in block 410, and then a first private region may be reserved in a volume in block 420. Next, a second private region may be reserved in a storage device in block 430. The storage device may be the physical storage entity pointed to by the volume. Then, the first private region may be mapped to the second private region (block 440). After block 440, an access request may be received from a virtual machine and the access request may be addressed to the first private region (block 450). Next, the access request may be translated so that it addresses the second private region (block 460). The access request may be translated by a volume manager driver. Then, the access request may be processed in accordance with an I/O fencing technique (block 470). The I/O fencing technique may be based on the SCSI-3 PGR standard, or it may be based on a different I/O fencing standard. After block 470, method 400 may end in block 480.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for implementing Input/Output (I/O) fencing in a virtual machine cluster, the method comprising:
creating a first private region in a volume, wherein the volume comprises a virtual storage object that is logically mapped to one or more non-volatile storage devices, wherein the volume is shared by a plurality of virtual machines in the virtual machine cluster;
creating a second private region in a first non-volatile storage device;
mapping the first private region to the second private region;
receiving an I/O fencing request from a virtual machine addressed to the first private region in the volume, wherein the I/O fencing request is formed according to an I/O fencing protocol, and wherein the I/O fencing request comprises a request to isolate the volume from one or more virtual machines in the virtual machine cluster; and translating the I/O fencing request to address the second private region in the first non-volatile storage device.

2. The method as recited in claim 1, wherein the I/O fencing request comprises a key and/or group reservation data in accordance with the I/O fencing protocol.

3. The method as recited in claim 1, wherein the first non-volatile storage device comprising the second private region is one of the one or more non-volatile storage devices to which the volume is logically mapped.

4. The method as recited in claim 1, wherein the first non-volatile storage device comprising the second private region is not one of the one or more non-volatile storage devices to which the volume is logically mapped.

5. The method as recited in claim 1, wherein the I/O fencing request complies with a small computer system interface version three persistent group reservation (SCSI-3 PGR) standard.

6. The method as recited in claim 1, further comprising repeating said steps for a plurality of volumes.

7. The method as recited in claim 1, wherein the volume is created and managed by a volume manager and wherein the access request is translated by a volume manager driver.

8. A computer readable storage medium comprising program instructions to implement Input/Output (I/O) fencing in a virtual machine cluster, wherein when executed the program instructions are operable to:

create a first private region in a volume, wherein the volume comprises a virtual storage object that is logically mapped to one or more non-volatile storage devices, wherein the volume is shared by a plurality of virtual machines in the virtual machine cluster;

create a second private region in a first non-volatile storage device;

map the first private region to the second private region;

receive an I/O fencing request from a virtual machine addressed to the first private region in the volume, wherein the I/O fencing request is formed according to an I/O fencing protocol, and wherein the I/O fencing request comprises a request to isolate the volume from one or more virtual machines in the virtual machine cluster; and translate the I/O fencing request to address the second private region in the first non-volatile storage device.

9. The computer readable storage medium as recited in claim 8, wherein the I/O fencing request comprises a key and/or group reservation data in accordance with the I/O fencing protocol.

10. The computer readable storage medium as recited in claim 8, wherein the first non-volatile storage device comprising the second private region is one of the one or more non-volatile storage devices to which the volume is logically mapped.

11. The computer readable storage medium as recited in claim 8, wherein the storage device comprising the second private region is not one of the one or more non-volatile storage devices to which the volume is logically mapped.

12. The computer readable storage medium as recited in claim 8, wherein the I/O fencing request complies with a small computer system interface version three persistent group reservation (SCSI-3 PGR) standard.

13. The computer readable storage medium as recited in claim 8, wherein when executed the program instructions are further operable to repeat said steps for a plurality of volumes.

14. The computer readable storage medium as recited in claim 8, wherein the volume is created and managed by a volume manager and wherein the access request is translated by a volume manager driver.

15. A system comprising:

one or more computer systems configured to implement a volume manager driver and a virtual machine cluster, wherein the virtual machine cluster includes a plurality of virtual machines; and one or more non-volatile storage devices, wherein the plurality of virtual machines in the virtual machine cluster are configured to share a volume comprising a virtual storage object that is logically mapped to the one or more non-volatile storage devices;

wherein the volume manager driver is executable by the one or more computer systems to:

create a first private region in the volume;

create a second private region in a first non-volatile storage device of the one or more non-volatile storage devices;

map the first private region to the second private region;

receive an I/O fencing request from a virtual machine addressed to the first private region in the volume, wherein the I/O fencing request is formed according to an I/O fencing protocol, and wherein the I/O fencing request comprises a request to isolate the volume from one or more virtual machines in the virtual machine cluster; and translate the I/O fencing request to address the second private region in the first non-volatile storage device.

16. The system as recited in claim 15, wherein the I/O fencing request comprises a key and/or group reservation data in accordance with the I/O fencing protocol.

17. The system as recited in claim 15, wherein the I/O fencing request complies with a small computer system interface version three persistent group reservation (SCSI-3 PGR) standard.

18. The system as recited in claim 15, wherein the volume manager driver is further executable by the one or more computer systems to repeat said steps for a plurality of volumes.

19. The method as recited in claim 1, further comprising partitioning the first private region in the volume into separate regions for different virtual machines in the virtual machine cluster.

* * * * *